B. G. TURNER.
Wheels and Axles for Harvesters.
No. 141,965. Patented August 19, 1873.
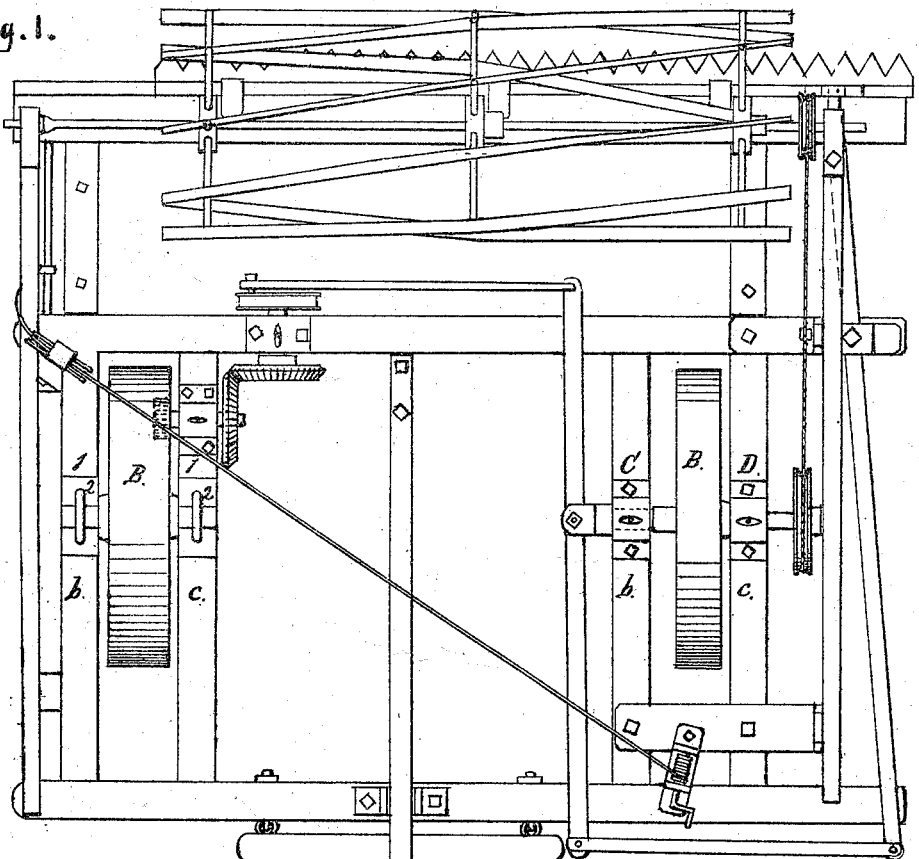
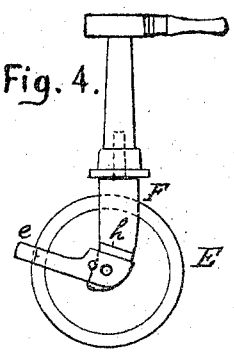
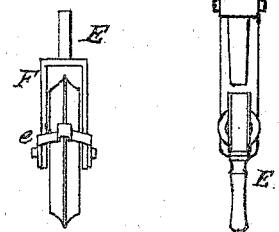
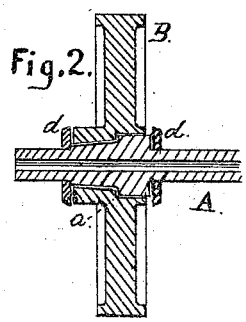
Witnesses.
C. H. Isham
H. A. Daniels
Inventor:
Benj. G. Turner.
By G. B. Towles Att.

UNITED STATES PATENT OFFICE.

BENJAMIN G. TURNER, OF FREMONT, NEBRASKA.

IMPROVEMENT IN WHEELS AND AXLES FOR HARVESTERS.

Specification forming part of Letters Patent No. 141,965, dated August 19, 1873; application filed April 19, 1873.

*To all whom it may concern:*

Be it known that I, BENJ. G. TURNER, of Fremont, in the county of Dodge and State of Nebraska, have invented a new and useful Improvement in Harvesters; and I do hereby declare that the following is a full, clear, and exact description of the construction and operation of the same, reference being had to the accompanying drawings making a part of this specification, in which—

Figure 1 is a plan view. Fig. 2 is a sectional view of wheel and tubular axle. Fig. 3 is an end view of stationary axle secured by straps in open boxes. Fig. 4 is a side view of tiller-wheel, and Fig. 5 is a front view of same.

Like letters in the various figures of the drawings indicate like parts.

This invention relates to that class of harvesters known as "headers;" and it consists in the construction and adaptation thereto of tubular revolving axles, having their bearings in boxes attached to the frame-work of the machine, and their ends open to admit a passage of air through the same to keep the axles from heating while revolving in the boxes, the said axles having the thimble-skeins cast thereon to receive the wheels which revolve with the axles, and provided with movable or adjustable washers to assist in keeping the wheels in place, and also prevent the dust or sand from getting onto the journals of the axles, the employment of the hollow axles lessening the weight of the machine and the power required to run it on soft ground, and larger axles and wheel-hubs can be used, thus strengthening the spokes of the wheel in their connection with the hub. This invention also relates to the peculiar construction and combination of an adjustable scraper with the tiller-wheel of a harvester, as will be hereinafter more fully explained and pointed out in the claims.

A tubular axle, A, open at each end and having the thimble-skein $a$ cast thereon to receive the wheel B, is placed on each side of the machine, with its journals in boxes C D, attached to the top of the beams $b\ c$, the wheel or wheels being placed between the beams. The axles may be placed below the beams instead of above, as described. Adjustable washers $d$ are placed on the axles, one on each side of the wheel, to assist in keeping the wheel in place, and also prevent dust or sand from getting onto the journals of the axles.

It will be seen that the axles revolve with the wheels, instead of their being fixed and the wheels revolving thereupon, as ordinarily, and also that their ends are left open and the usual plugs or screw-nuts for closing them dispensed with, so as to allow the air to circulate freely through the same to keep the axles from heating while revolving in the boxes. Thus, in headers where the frame-work is usually heavy, and the ordinary axles are used, it will be found that the employment of the hollow axle is of peculiar advantage in its adaptation to this class of harvesters, especially in the prairie or western country, where the soil is of a soft or alluvial nature, and it is desirable, therefore, to have the machine as light as possible, in order that it may run easier. Another advantage is in giving greater strength to the wheel, by being enabled to use larger axles and wheel-hubs.

The axles may be held in a rigid position, and the wheels revolve on it, as ordinarily, by the thimble-skeins being cast separate from the axles, and the ends thereof made so as to set in open boxes 1, having straps 2 to hold the journals firm therein, (see Fig. 3;) but I prefer to use the revolving axles, as above described.

In order to lighten the machine as much as possible I use a hollow tiller-wheel, E, and provide it with an adjustable scraper, $e$, consisting of two arms, one arranged on each side of the wheel and attached to the axis or pivotal support thereof, and projecting forward therefrom to the front of the wheel, where they embrace a block of wood or metal forming the scraper proper. The rear portions of the arms are made wide enough to give them a suitable bearing upon the sides of the shoe F, having shoulders $h$, or their equivalent, on each side thereof, for holding the arms in a fixed position, the upper edges of the arms being beveled to fit the inwardly-beveled edges of the shoulders. The arms of the scraper are fastened to the pivotal support of the wheel by screw-nuts, and are provided with a suitable number of holes, by which the scraper can be adjusted as close to the wheel as the circumstances of the case may require, to keep the wheel clean.

I do not propose to confine the use of the scraper to a hollow tiller-wheel, as it can be used as well with a solid one and accomplish the purpose just the same.

The operation or idea of this invention is, that while the use of hollow axles renders the machine lighter and also prevents the journals from heating by their ends being left open, as hereinbefore explained, still this is not the sole purpose for which the hollow axles are used in this invention, the principal object being to enable axles of a larger diameter than ordinary to be used, so as to use larger hubs, and thus strengthen the connection of the spokes therewith without a corresponding increase in the weight of the metal.

I do not claim, broadly, a tubular or hollow axle, as I am aware that the same has been patented in its connection with carriages and wagons; but What I do claim, and desire to secure by Letters Patent, is—

1. The wheels B B of a header, arranged centrally on hollow axles A A with open ends, between adjustable washers $d$ $d$, the axles having the thimble-skein $a$ cast thereon, and arranged to revolve with the wheels in boxes C D attached to beams $b$ $c$ of the machine, the whole constructed, combined, and adapted for the purpose substantially as shown and set forth.

2. The adjustable scraper $e$, with arms attached and arranged one on each side of the wheel, in combination with its pivotal or axial support, and the shoe F having beveled shoulders $h$, substantially as set forth.

As evidence that I claim the foregoing as my invention I have hereunto set my hand and seal in the presence of two witnesses this 17th day of January, 1873.

BENJAMIN G. TURNER. [L. S.]

Witnesses:
WILLIAM MARTIN,
J. J. HAWTHORNE.